United States Patent
Seo et al.

(10) Patent No.: US 7,455,614 B2
(45) Date of Patent: Nov. 25, 2008

(54) POWER TRAIN OF AUTOMATIC TRANSMISSION

(75) Inventors: Kang Soo Seo, Suwon (KR); Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 266 days.

(21) Appl. No.: 11/590,635

(22) Filed: Oct. 31, 2006

(65) Prior Publication Data
US 2008/0009383 A1     Jan. 10, 2008

(30) Foreign Application Priority Data
Jul. 5, 2006   (KR) .................. 10-2006-0063080

(51) Int. Cl.
*F16H 3/44*     (2006.01)
*F16H 3/62*     (2006.01)

(52) U.S. Cl. ............... 475/280; 475/276; 475/278; 475/313

(58) Field of Classification Search ......... 475/276–278, 475/280, 288, 313
See application file for complete search history.

(56) References Cited

U.S. PATENT DOCUMENTS

| | | | | |
|---|---|---|---|---|
| 4,823,641 A | * | 4/1989 | Kuhn et al. .......... | 475/277 |
| 5,112,285 A | * | 5/1992 | Hall, III .......... | 475/280 |
| 6,302,820 B1 | * | 10/2001 | Ried .......... | 475/276 |
| 7,384,364 B2 | * | 6/2008 | Jang .......... | 475/275 |
| 2005/0113205 A1 | | 5/2005 | Oguri et al. | |

* cited by examiner

*Primary Examiner*—Roger Pang
(74) *Attorney, Agent, or Firm*—Morgan, Lewis & Bockius LLP

(57) ABSTRACT

A power train of an automatic transmission that realizes seven forward speeds and two reverse speeds includes a first planetary gear set a second planetary gear set; a third planetary gear set an input shaft; an output gear; and a transmission case. A third planet carrier is fixedly connected to a first ring gear, a second ring gear is fixedly connected to the a planet carrier, a long-pinion-side ring gear acts as an input element by being fixedly connected to the input shaft, and a second planet carrier acts as an output element by being fixedly connected to the output gear. Also, a second ring gear is variably connected to the input shaft via a first clutch, a first sun gear is variably connected to the first planet carrier via a second clutch, the second sun gear is variably connected to the first sun gear via a third clutch, and the short-pinion-side ring gear is variably connected to the transmission case via a first brake.

7 Claims, 3 Drawing Sheets

FIG.2

|  | C1 | C2 | C3 | B1 | B2 | B3 | B4 |
|---|---|---|---|---|---|---|---|
| REV.1 |  |  | ● | ● |  |  | ● |
| REV.2 |  |  | ● |  |  | ● | ● |
| D1 |  |  | ● | ● | ● |  |  |
| D2 |  |  | ● |  | ● | ● |  |
| D3 |  | ● |  |  | ● | ● |  |
| D4 |  | ● | ● |  |  | ● |  |
| D5 | ● | ● | ● |  |  |  |  |
| D6 | ● |  | ● |  |  | ● |  |
| D7 | ● |  | ● | ● |  |  |  |

POWER TRAIN OF AUTOMATIC TRANSMISSION

CROSS-REFERENCE TO RELATED APPLICATION

This application claims priority to and the benefit of Korean Patent Application No. 10-2006-0063080 filed in the Korean Intellectual Property Office on Jul. 5, 2006, the entire contents of which are incorporated herein by reference.

BACKGROUND OF THE INVENTION (a) Field of the Invention

The present invention relates to a power train of an automatic transmission. More particularly, the present invention relates to a power train of an automatic transmission that realizes seven forward speeds and two reverse speeds.

(b) Description of the Related Art

A typical shift mechanism of an automatic transmission utilizes a combination of a plurality of planetary gear sets. A power train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance.

For that reason, an automatic transmission that enables more shift speeds is under constant investigation.

In addition, with the same number of speeds, features of a power train such as durability, efficiency in power transmission, and size depend a lot on the layout of the combined planetary gear sets. Therefore, designs for a combining structure of a power train are also under constant investigation.

A manual transmission that has too many speeds causes an inconvenience of excessively frequent shifting operations to a driver. Therefore, the positive features of more shift-speeds are more important for automatic transmissions because an automatic transmission automatically controls shifting operations without needing any manual operation.

Recently, power trains of automatic transmissions that realize seven forward speeds have been developed. For example, U.S. Patent Laid-Open No. US2005/0113205 A1 discloses a power train of an automatic transmission that realizes seven forward speeds and one reverse speed by using four planetary gear sets, five brakes, and three clutches. However, since the power train of US2005/0113205 A1 includes four planetary gear sets, five brakes, and three clutches, the power train is heavy. In addition, it is difficult to dispose frictional elements such as brakes and clutches in the transmission according to the power train of US2005/0113205 A1.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a power train of an automatic transmission having advantages of realizing seven forward speeds and two reverse speeds by using three planetary gear sets, three clutches, and four brakes.

An exemplary power train of an automatic transmission according to an embodiment of the present invention may include: a first planetary gear set having operating members of a first sun gear, a first ring gear, and a first planet carrier; a second planetary gear set having operating members of a second sun gear, a second ring gear, and a second planet carrier; a third planetary gear set having operating members of a third sun gear, a short-pinion-side ring gear, a long-pinion-side ring gear, and a third planet carrier; an input shaft; an output gear, and a transmission case. The third planet carrier is fixedly connected to the first ring gear, the second ring gear is fixedly connected to the first planet carrier, the long-pinion-side ring gear always acts as an input element by being fixedly connected to the input shaft, and the second planet carrier always acts as an output element by being fixedly connected to the output gear. Also, the second ring gear is variably connected to the input shaft via a first clutch, the first sun gear is variably connected to the first planet carrier via a second clutch, the second sun gear is variably connected to the first sun gear via a third clutch, and the short-pinion-side ring gear is variably connected to the transmission case via a first brake and is subjected to a stopping operation of the first brake. Further, at least one of the variably connected first sun gear and the second sun gear is variably connected to the transmission case via a second brake and is subjected to a stopping operation of the second brake, the third sun gear is variably connected to the transmission case via a third brake and is subjected to a stopping operation of the third brake, and the first planet carrier is variably connected to the transmission case via a fourth brake and is subjected to a stopping operation of the fourth brake.

The first, second, and third planetary gear sets may be disposed in a sequence of the third planetary gear set, the second planetary gear set, and the first planetary gear set.

The input shaft and the output gear may be disposed on the same side.

The first and third brakes may be disposed on the same side and the second and fourth brakes may be disposed on the same side.

The first and third brakes may be disposed on an opposite side to the second and fourth brakes with reference to the planetary gear sets.

The first clutch may be disposed between the second planetary gear set and the third planetary gear set, and the second and third clutches may be disposed on an opposite side to the first clutch with reference to the first planetary gear set.

The third clutch and the first and second brakes may be operated in a first forward speed; the third clutch and the second and third brakes be operated in a second forward speed; the second clutch and the second and third brakes be operated in a third forward speed; the second and third clutches and the third brake be operated in a fourth forward speed; the first, second, and third clutches be operated in a fifth forward speed, the first and third clutches and the third brake be operated in a sixth forward speed; the first and third clutches and the first brake be operated in a seventh forward speed; the third clutch and the first and fourth brakes be operated in a first reverse speed; and the third clutch and the third and fourth brakes be operated in a second reverse speed.

BRIEF DESCRIPTION OF THE DRAWINGS

FIG. 2 is an operational chart for a power train of an automatic transmission according to an exemplary embodiment of the present invention.

DETAILED DESCRIPTION OF THE EMBODIMENT

An exemplary embodiment of the present invention will hereinafter be described in detail with reference to the accompanying drawings.

Figure 1:
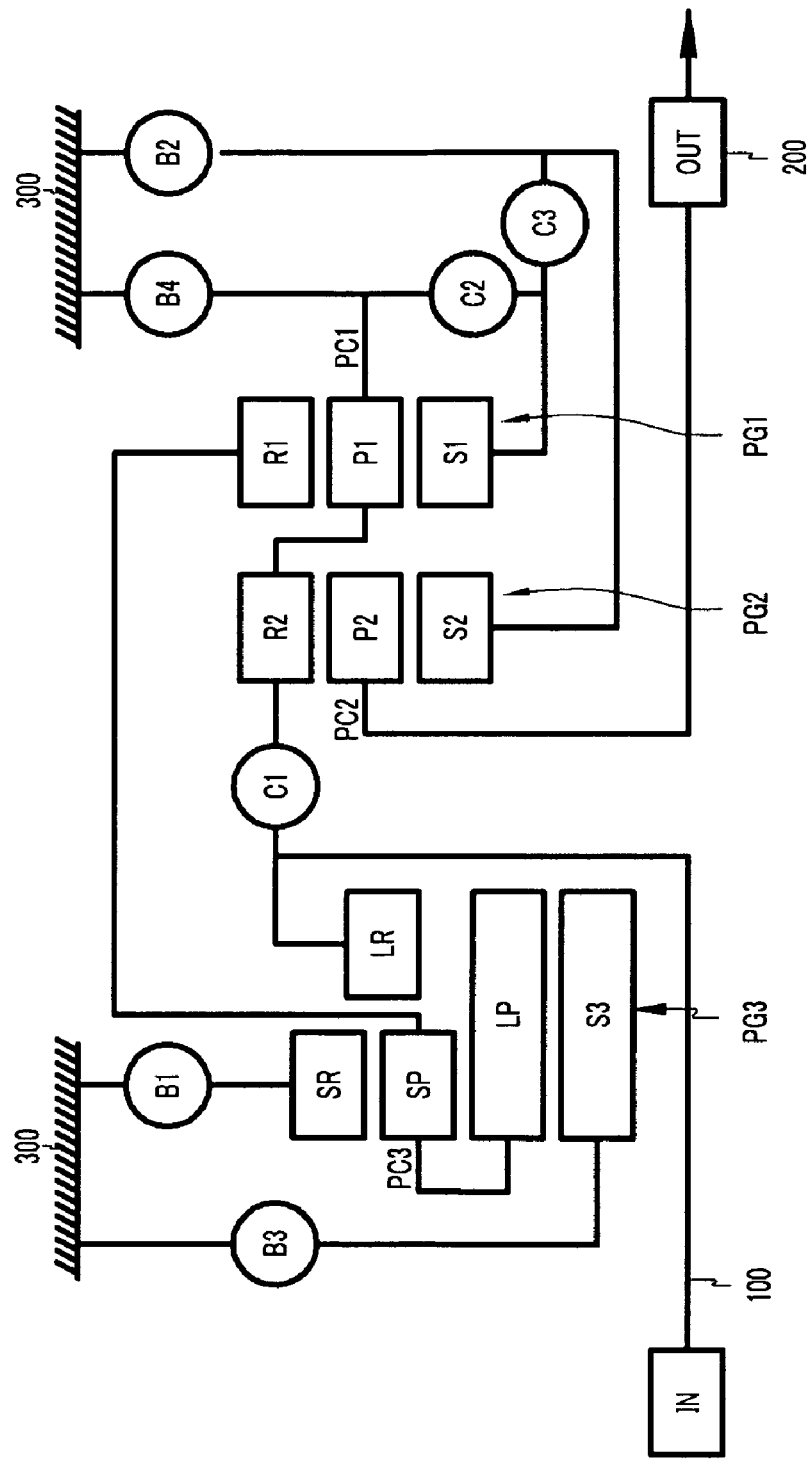
FIG. 1 is a schematic diagram of a power train of an automatic transmission according to an exemplary embodiment of the present invention.

As shown in FIG. 1, an exemplary power train of an automatic transmission according to an embodiment of the present invention includes three planetary gear sets of first, second, and third planetary gear sets PG1, PG2, and PG3.

The first planetary gear set PG1 is a single pinion planetary gear set, and includes a first sun gear S1, a first planet carrier PC1, and a first ring gear R1 as operating members thereof. A first pinion gear P1, being engaged with both the first ring gear R1 and the first sun gear S1, is connected to and carried by the first planet carrier PC1.

The second planetary gear set PG2 is a single pinion planetary gear set, and includes a second sun gear S2, a second planet carrier PC2, and a second ring gear R2 as operating members thereof. A second pinion gear P2, being engaged with the second-ring gear R2 and the second sun gear S2, is connected to and carried by the second planet carrier PC2.

The third planetary gear set PG3 is a compound planetary gear set, and includes a double pinion planetary gear set including a third sun gear S3, a short pinion gear SP, a long pinion gear LP, and a short-pinion-side ring gear SR, and a single pinion planetary gear set including the third sun gear S3, the long pinion gear LP, and a long-pinion-side ring gear LR. The third planetary gear set PG3 further includes a third planet carrier PC3 rotatably supporting the short pinion gear SP and the long pinion gear LP.

In addition, the third sun gear S3, the third planet carrier PC3, the short-pinion-side ring gear SR, and the long-pinion-side ring gear LR are used as operating members of the third planetary gear set PG3.

In addition, an exemplary power train of an automatic transmission according to an embodiment of the present invention includes an input shaft 100 for receiving torque from an engine (not shown), an output gear 200 for outputting torque from the power train, and a transmission case 300.

As shown in FIG. 1, the third planet carrier PC3 is fixedly connected to the first ring gear R1. The second ring gear R2 is fixedly connected to the first planet carrier PC1. The long-pinion-side ring gear LR always acts as an input element by being fixedly connected to the input shaft 100. The second planet carrier PC2 always acts as an output element by being fixedly connected to the output gear 200. The second ring gear R2 is variably connected to the input shaft 100 via a first clutch C1. The first sun gear S1 is variably connected to the first planet carrier PC1 via a second clutch C2.

The second sun gear S2 is variably connected to the first sun gear S1 via a third clutch C3. The short-pinion-side ring gear SR is variably connected to the transmission case 300 via a first brake B1 and is subjected to a stopping operation of the first brake B1.

At least one of the variably connected first sun gear S1 and the second sun gear S2 is variably connected to the transmission case 300 via a second brake B2 and is subjected to a stopping operation of the second brake B2. The third sun gear S3 is variably connected to the transmission case 300 via a third brake B3 and is subjected to a stopping operation of the third brake B3. The first planet carrier PC1 is variably connected to the transmission case 300 via a fourth brake B4 and is subjected to a stopping operation of the fourth brake B4.

The first, second, and third planetary gear sets PG1, PG2, and PG3 are disposed in a sequence of the third planetary gear set PG3, the second planetary gear set PG2, and the first planetary gear set PG1 according to an exemplary embodiment of an present invention.

The input shaft 100 and the output gear 200 are disposed on the same side. The first brake B1 and the third brake B3 are disposed on the same side. In addition, the second brake B2 and the fourth brake B4 are disposed on the same side.

In addition, the first brake B1 and the third brake B3 are disposed on an opposite side to the second brake B2 and the fourth brake B4 with reference to the planetary gear sets PG1, PG2, and PG3.

The first clutch C1 is disposed between the second planetary gear set PG2 and the third planetary gear set PG3, and the second clutch C2 and the third clutch C3 are disposed on an opposite side to the first clutch C1 with reference to the first planetary gear set PG1.

Hereinafter, operation of power train of an automatic transmission according to the exemplary embodiment of the present invention will be described.

As shown in FIG. 2, according to an exemplary embodiment of the present invention, the third clutch C3 and the first and second brakes B1 and B2 are operated in a first forward speed D1, the third clutch C3 and the second and third brakes B2 and B3 are operated in a second forward speed D2, the second clutch C2 and the second and third brakes B2 and B3 are operated in a third forward speed D3, the second and third clutches C2 and C3 and the third brake B3 are operated in a fourth forward speed D4, the first, second, and third clutches C1, C2, and C3 are operated in a fifth forward speed D5, the first and third clutches C1 and C3 and the third brake B3 are operated in a sixth forward speed, and the first and third clutches C1 and C3 and the first brake B1 are operated in a seventh forward speed D7.

In addition, the third clutch C3 and the first and fourth brakes B1 and B4 are operated in a first reverse speed REV. 1 and the third clutch C3 and the third and fourth brakes B3 and B4 are operated in a second reverse speed REV. 2.

Hereinafter, up-shifting processes of an exemplary power train of an automatic transmission according to the embodiment of the present invention will be described in detail.

In a shifting process from the first forward speed D1 to the second forward speed D2, the first brake B1 is released and the third brake B3 is operated.

In a shifting process from the second forward speed D2 to the third forward speed D3, the third clutch C3 is released and the second clutch C2 is operated.

In a shifting process from the third forward speed D3 to the fourth forward speed D4, the second brake B2 is released and the third clutch C3 is operated.

In a shifting process from the fourth forward speed D4 to the fifth forward speed D5, the third brake B3 is released and the first clutch C1 is operated.

In a shifting process from the fifth forward speed D5 to the sixth forward speed D6, the second clutch C2 is released and the third brake B3 is operated.

In a shifting process from the sixth forward speed D6 to the seventh forward speed D7, the third brake B3 is released and the first brake B1 is operated.

In a shifting process from the first reverse speed Rev. 1 to the second reverse speed Rev. 2, the first brake B1 is released and the third brake B3 is operated.

Down-shifting processes are reverse processes of the up-shifting processes according to an exemplary embodiment of the present invention.

Hereinafter, skip up-shifting processes according to an exemplary embodiment of the present invention will be described.

In a skip up-shifting process from the first forward speed D1 to the third forward speed D3, the third clutch C3 and the first brake B1 are released and the second clutch C2 and the third brake B3 are operated.

In a skip up-shifting process from the second forward speed D2 to the fourth forward speed D4, the second brake B2 is released and the second clutch C2 is operated.

In a skip up-shifting process from the third forward speed D3 to the fifth forward speed D5, the second and third brakes B2 and B3 are released and the first and third clutches C1 and C3 are operated.

In a skip up-shifting process from the fourth forward speed D4 to the sixth forward speed D6, the second clutch C2 is released and the first clutch C1 is operated.

In a skip up-shifting process from the fifth forward speed D5 to the seventh forward speed D7, the second clutch C2 is released and the first brake B1 is operated.

In a skip up-shifting process from the first forward speed D1 to the fourth forward speed D4, the first and second brakes B1 and B2 are released and the second clutch C2 and the third brake B3 are operated.

In a skip up-shifting process from the second forward speed D2 to the fifth forward speed D5, the second and third brakes B2 and B3 are released and the first and second clutches C1 and C2 are operated.

In a skip up-shifting process from the third forward speed D3 to the sixth forward speed D6, the second clutch C2 and the second brake B2 are released and the first and third clutches C1 and C3 are operated.

In a skip up-shifting process from the fourth forward speed D4 to the seventh forward speed D7, the second clutch C2 and the third brake B3 are released and the first clutch C1 and the first brake B1 are operated.

Skip down-shifting processes are reverse processes of the skip up-shifting processes according to an exemplary embodiment of the present invention.

Figure 3:
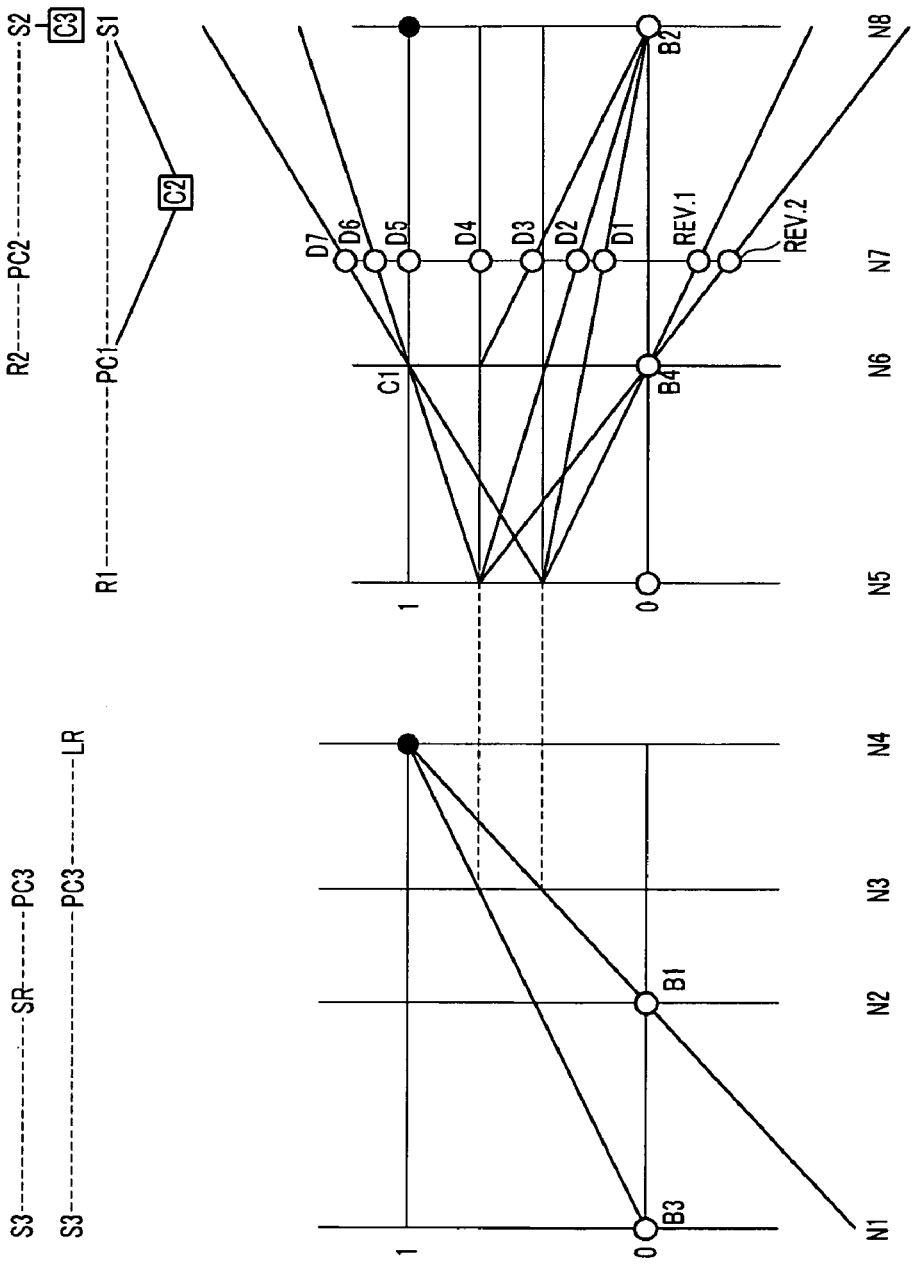
FIG. 3 is a lever diagram showing shifting processes from a first forward speed to a seventh forward speed, and from a first reverse speed to a second reverse speed in a power train of an automatic transmission according to an embodiment of the present invention.

As shown in FIG. 3, an exemplary power train of an automatic transmission according to an embodiment of the present invention includes one compound planetary gear set and two single pinion planetary gear sets. In addition, the second ring gear R2 is fixedly connected to the first planet carrier PC1, and the first sun gear S1 is variably connected to the second sun gear S2 via the third clutch C3. Therefore, operational elements of the exemplary power train of an automatic transmission according to the embodiment of the present invention are represented as eight nodes in the lever diagram.

Accordingly, the third sun gear S3 is set to a first node N1, the short-pinion-side ring gear SR is set to a second node N2, the third planet carrier PC3 is set to a third node N3, the long-pinion-side ring gear LR is set to a fourth node N4, the first ring gear R1 is set to a fifth node N5, the second ring gear R2 and the first planet carrier PC1 are set to a sixth node N6, the second planet carrier PC2 is set to a seventh node N7, and the first sun gear S1 and the second sun gear S2 are set to an eighth node N8.

As described above, the fourth node N4 of the long-pinion-side ring gear LR always acts as the input element by being fixedly connected to the input shaft 100.

The third planet carrier PC3 is fixedly connected to the first ring gear R1. Therefore, the fifth node N5 and the third node N3 rotate with the same rotational speed.

The sixth node N6 of the second ring gear R2 is variably connected to the input shaft 100 via the first clutch C1. Therefore, rotational speed of the engine inputted through the input shaft 100 is transmitted to the sixth node N6 by an operation of the first clutch C1.

The first planet carrier PC1 is variably connected to the first sun gear S1 via the second clutch C2. Therefore, the sixth node N6 and the eighth node N8 rotate with the same rotational speed, by an operation of the second clutch C2.

In addition, the short-pinion-side ring gear SR is variably connected to the transmission case 300 via the first brake B1, and at least one of the fixedly connected first sun gear S1 and the second sun gear S2 is variably connected to the transmission case 300 via the second brake B2. The third sun gear S3 is variably connected to the transmission case 300 via the third brake B3, and the first planet carrier PC1 is variably connected to the transmission case 300 via the fourth brake B4. Therefore, the second node N2, the eighth node N8, the first node N1, and the sixth node N6 may be stopped by operations of the first, second, third, and fourth brakes B1, B2, B3, and B4, respectively.

Hereinafter, formation of each speed by the power-train of an automatic transmission according to the exemplary embodiment of the present invention will be described in detail, with reference to FIG. 3.

In the first forward speed D1, the second node N2 is stationary since the first brake B1 is operated, and the fourth node N4 rotates with the same rotational speed of the input shaft 100. Therefore, the third node N3 rotates with a first reduced rotational speed, and the fifth node N5 fixedly connected to the third node N3 rotates with the first reduced rotational speed. In addition, the eighth node N8 is stationary since the second brake B2 and the third clutch C3 are operated. Therefore, the first forward speed D1 is achieved at the seventh node N7 that is the output element.

In the second forward speed D2, the first node N1 is stationary since the third brake B3 is operated, and the fourth node N4 rotates with the same rotational speed of the input shaft 100. Therefore, the third node N3 rotates with a second reduced rotational speed, and the fifth node N5 fixedly connected to the third node N3 rotates with the second reduced rotational speed. In addition, the eighth node N8 is stationary since the second brake B2 and the third clutch C3 are operated. Therefore, the second forward speed D2 is achieved at the seventh node N7 that is the output element.

In the third forward speed D3, the first node N1 is stationary since the third brake B3 is operated, and the fourth node N4 rotates with the same rotational speed of the input shaft 100. Therefore, the third node N3 rotates with the second reduced rotational speed, and the fifth node N5 fixedly connected to the third node N3 rotates with the second reduced rotational speed. In addition, the sixth node N6 rotates with the same rotational speed of the fifth node N5 since the second clutch C2 is operated, and the eighth node N8 is stationary since the second brake B2 is operated. Therefore, the first forward speed D3 is achieved at the seventh node N7 that is the output element.

In the fourth forward speed D4, the first node N1 is stationary since the third brake B3 is operated, and the fourth node N4 rotates with the same rotational speed of the input shaft 100. Therefore, the third node N3 rotates with the second reduced rotational speed, and the fifth node N5 fixedly connected to the third node N3 rotates with the second reduced rotational speed. In addition, the sixth node N6 and the eighth node N8 respectively rotate with the same rotational speed of the fifth node N5 since the second clutch C2 and the third clutch C3 are operated. Therefore, the first forward speed D4 is achieved at the seventh node N7 that is the output element.

In the fifth forward speed D5, the sixth node N6 rotates with the same rotational speed of the input shaft 100 since the first clutch C1 is operated. In addition, the fifth node N5 and the eighth node N8 respectively rotate with the same rotational speed of the sixth node N6 since the second clutch C2 and the third clutch C3 are operated. Therefore, the first forward speed D5 is achieved at the seventh node N7 that is the output element.

In the sixth forward speed D6, the first node N1 is stationary since the third brake B3 is operated, and the fourth node N4 rotates with the same rotational speed of the input shaft 100. Therefore, the third node N3 rotates with the second reduced rotational speed, and the fifth node N5 fixedly connected to the third node N3 rotates with the second reduced rotational speed. In addition, the sixth node N6 rotates with the same rotational speed of the input shaft 100 since the first clutch C1 is operated. Therefore, the first forward speed D6 is achieved at the seventh node N7 that is the output element.

In the seventh forward speed D7, the second node N2 is stationary since the first brake B1 is operated, and the fourth node N4 rotates with the same rotational speed of the input shaft 100. Therefore, the third node N3 rotates with the first reduced rotational speed, and the fifth node N5 fixedly connected to the third node N3 rotates with the first reduced rotational speed. In addition, the sixth node N6 rotates with the same rotational speed of the input shaft 100 since the first clutch C1 is operated. Therefore, the first forward speed D7 is achieved at the seventh node N7 that is the output element.

In the first reverse speed REV. 1, the second node N2 is stationary since the first brake B1 is operated, and the fourth node N4 rotates with the same rotational speed of the input shaft 100. Therefore, the third node N3 rotates with the first reduced rotational speed, and the fifth node N5 fixedly connected to the third node N3 rotates with the first reduced rotational speed. In addition, the sixth node N6 is stationary since the fourth brake B4 is operated. Therefore, the first reverse speed REV. 1 is achieved at the seventh node N7 that is the output element.

In the second reverse speed REV. 2, the first node N1 is stationary since the third brake B3 is operated, and the fourth node N4 rotates with the same rotational speed of the input shaft 100. Therefore, the third node N3 rotates with the second reduced rotational speed, and the fifth node N5 fixedly connected to the third node N3 rotates with the second reduced rotational speed. In addition, the sixth node N6 is stationary since the fourth brake B4 is operated. Therefore, the second reverse speed REV. 2 is achieved at the seventh node N7 that is the output element.

As described above, the speed line for each planetary gear set may be easily obtained by a person of an ordinary skill in the art based on the teachings herein.

According to an exemplary embodiment of the present invention, the seven forward speeds and two reverse speeds may be realized by utilizing three planetary gear sets, three clutches, and four brakes.

In addition, shift feel may be improved by reducing frictional elements that are engaged or released in the shifting processes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of an automatic transmission, comprising:
    a first planetary gear set having operating members of a first sun gear, a first ring gear, and a first planet carrier;
    a second planetary gear set having operating members of a second sun gear, a second ring gear, and a second planet carrier;
    a third planetary gear set having operating members of a third sun gear, a short-pinion-side ring gear, a long-pinion-side ring gear, and a third planet carrier;
    an input shaft;
    an output gear; and
    a transmission case,
    wherein the third planet carrier is fixedly connected to the first ring gear,
    the second ring gear is fixedly connected to the first planet carrier,
    the long-pinion-side ring gear always acts as an input element by being fixedly connected to the input shaft,
    the second planet carrier always acts as an output element by being fixedly connected to the output gear,
    the second ring gear is variably connected to the input shaft via a first clutch,
    the first sun gear is variably connected to the first planet carrier via a second clutch,
    the second sun gear is variably connected to the first sun gear via a third clutch,
    the short-pinion-side ring gear is variably connected to the transmission case via a first brake and is subjected to a stopping operation of the first brake,
    at least one of the variably connected first sun gear and the second sun gear is variably connected to the transmission case via a second brake and is subjected to a stopping operation of the second brake,
    the third sun gear is variably connected to the transmission case via a third brake and is subjected to a stopping operation of the third brake, and
    the first planet carrier is variably connected to the transmission case via a fourth brake and is subjected to a stopping operation of the fourth brake.

2. The power train of claim 1, wherein the first, second, and third planetary gear sets are disposed in a sequence of the third planetary gear set, the second planetary gear set, and the first planetary gear set.

3. The power train of claim 1, wherein the input shaft and the output gear are disposed on the same side.

4. The power train of claim 1, wherein the first and third brakes are disposed on the same side and the second and fourth brakes are disposed on the same side.

5. The power train of claim 4, wherein the first and third brakes are disposed on an opposite side to the second and fourth brakes with reference to the planetary gear sets.

6. The power train of claim 1, wherein the first clutch is disposed between the second planetary gear set and the third planetary gear set, and the second and third clutches are disposed on an opposite side to the first clutch with reference to the first planetary gear set.

7. The power train of claim 1, wherein:
    the third clutch and the first and second brakes are operated in a first forward speed;
    the third clutch and the second and third brakes are operated in a second forward speed;

the second clutch and the second and third brakes are operated in a third forward speed;

the second and third clutches and the third brake are operated in a fourth forward speed;

the first, second, and third clutches are operated in a fifth forward speed, the first and third clutches and the third brake are operated in a sixth forward speed;

the first and third clutches and the first brake are operated in a seventh forward speed;

the third clutch and the first and fourth brakes are operated in a first reverse speed; and the third clutch and the third and fourth brakes are operated in a second reverse speed.

* * * * *